United States Patent
Gong et al.

(10) Patent No.: US 6,865,576 B1
(45) Date of Patent: Mar. 8, 2005

(54) EFFICIENT SCHEMA FOR STORING MULTI-VALUE ATTRIBUTES IN A DIRECTORY SERVICE BACKING STORE

(75) Inventors: Shia-San Gong, Round Rock, TX (US); Rodolfo Augusto Mancisidor, Austin, TX (US); Chetan Ram Murthy, New York, NY (US); Shaw-Ben Shi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/316,754

(22) Filed: May 21, 1999

(51) Int. Cl.$^7$ ................................................ G06F 7/00
(52) U.S. Cl. ...................... 707/100; 718/100; 707/101; 707/102; 707/103
(58) Field of Search ............................ 707/103, 10, 3, 707/102, 101, 2; 709/100

(56) References Cited

U.S. PATENT DOCUMENTS

| | | | | |
|---|---|---|---|---|
| 5,010,478 A | * | 4/1991 | Deran | 707/100 |
| 5,201,046 A | * | 4/1993 | Goldberg et al. | 707/100 |
| 5,297,040 A | * | 3/1994 | Hu | 704/9 |

(List continued on next page.)

FOREIGN PATENT DOCUMENTS

| EP | 435478 A2 | * | 7/1991 | G06F/9/44 |
|---|---|---|---|---|
| EP | 1126383 A1 | * | 8/2001 | G06F/17/30 |

OTHER PUBLICATIONS

Srinivasan et al. "Method and system for representing and accessing object–oriented data in a relational database system." US Pat. application publication 2001/00519948 A1.*
Zgaraba et al. "Method and apparatus for round–trip software engineering." US Pat application publication 2002/0170048 A1.*
Delo, John. "Software installation and validation using custom actions." US Pat application publication 2002/0092013 A1.*
Hitchcock et al., Universal–forms engine, Jun. 4, 1998, U.S. pat. application Publication No. 2002/0120628 A1.*

Primary Examiner—Meng-Al T. An
Assistant Examiner—Lilian Vo
(74) Attorney, Agent, or Firm—Barry S. Newberger; Jeffrey S. LaBaw

(57) ABSTRACT

A database schema for storing application data in a relational database backing store of a directory service. The application data has at least some entries with multiple value attributes. According to the invention, the application data is profiled to determine how it may be optimally stored in the backing store. Preferably, single entries having single value attributes are stored in a merged attribute table, while entries having multiple value attributes are stored in per attribute tables. According to the optimization, a majority of the attributes are single valued and are stored in the merged table, and the per attribute tables thus store a relatively smaller number of exceptions. This database schema enhances processing of conventional directory service queries into the backing store.

7 Claims, 5 Drawing Sheets

U.S. PATENT DOCUMENTS

| | | | | |
|---|---|---|---|---|
| 5,359,729 A | * | 10/1994 | Yarnell et al. | 707/2 |
| 5,410,704 A | * | 4/1995 | Norden-Paul et al. | 709/101 |
| 5,412,804 A | * | 5/1995 | Krishna | 707/2 |
| 5,418,961 A | * | 5/1995 | Segal et al. | 707/1 |
| 5,485,610 A | * | 1/1996 | Gioielli et al. | 707/102 |
| 5,615,367 A | * | 3/1997 | Bennett et al. | 707/102 |
| 5,717,924 A | * | 2/1998 | Kawai | 707/102 |
| 5,758,347 A | * | 5/1998 | Lo et al. | 707/103 R |
| 5,787,411 A | * | 7/1998 | Groff et al. | 707/2 |
| 5,787,415 A | * | 7/1998 | Jacobson et al. | 707/2 |
| 5,797,008 A | * | 8/1998 | Burrows | 707/101 |
| 5,838,810 A | | 11/1998 | Buzbee | |
| 5,899,997 A | * | 5/1999 | Ellacott | 707/103 R |
| 5,940,818 A | * | 8/1999 | Malloy et al. | 707/2 |
| 5,956,704 A | * | 9/1999 | Gautam et al. | 707/1 |
| 5,963,642 A | * | 10/1999 | Goldstein | 713/193 |
| 5,966,704 A | * | 10/1999 | Furegati et al. | 707/3 |
| 5,970,490 A | * | 10/1999 | Morgenstern | 707/10 |
| 6,016,497 A | * | 1/2000 | Suver | 707/103 R |
| 6,078,923 A | * | 6/2000 | Burrows | 707/101 |
| 6,120,553 A | * | 9/2000 | Sidwell | 717/151 |
| 6,161,170 A | * | 12/2000 | Burger et al. | 712/30 |
| 6,188,999 B1 | * | 2/2001 | Moody | 706/11 |
| 6,240,422 B1 | * | 5/2001 | Atkins et al. | 707/102 |
| 6,324,533 B1 | * | 11/2001 | Agrawal et al. | 707/3 |
| 6,366,926 B1 | * | 4/2002 | Pohlmann et al. | 707/104.1 |
| 6,370,524 B1 | * | 4/2002 | Witkowski | 707/3 |
| 6,385,496 B1 | * | 5/2002 | Irwin et al. | 700/87 |
| 6,397,219 B2 | * | 5/2002 | Mills | 707/10 |
| 6,397,221 B1 | * | 5/2002 | Greef et al. | 707/102 |
| 6,453,356 B1 | * | 9/2002 | Sheard et al. | 709/231 |
| 6,510,216 B1 | * | 1/2003 | Burr et al. | 379/201.12 |
| 6,539,388 B1 | * | 3/2003 | Hattori et al. | 707/101 |
| 6,542,515 B1 | * | 4/2003 | Kumar et al. | 370/463 |

* cited by examiner

Merged Attribute Table

| Attr_1 | Attr_1_R | Attr_2 | Attr_3 | ... |
|---|---|---|---|---|
| Value 1 | ... | | | |
| Value 2 | | | | |
| Value 3 | | | | |
| ⋮ | | | | |
| | | | | |
| | | | | |
| | | | | |

Figure 8

EFFICIENT SCHEMA FOR STORING MULTI-VALUE ATTRIBUTES IN A DIRECTORY SERVICE BACKING STORE

This application includes subject matter protected by copyright. All rights are reserved.

BACKGROUND OF THE INVENTION

1. Technical Field

This invention relates generally to providing directory services in a distributed computing environment.

2. Description of the Related Art

A directory service is the central point where network services, security services and applications can form an integrated distributed computing environment. Typical uses of a directory services may be classified into several categories. A "naming service" (e.g., DNS and DCE Cell Directory Service (CDS)) uses the directory as a source to locate an Internet host address or the location of a given server. A "user registry" (e.g., Novell NDS) stores information about users in a system composed of a number of interconnected machines. The central repository of user information enables a system administrator to administer the distributed system as a single system image. Still another directory service is a "white pages" lookup provided by some e-mail clients, e.g., Netscape Communicator, Lotus Notes, Endora and the like).

With more and more applications and system services demanding a central information repository, the next generation directory service will need to provide system administrators with a data repository that can significantly ease administrative burdens. In addition, the future directory service must also provide end users with a rich information data warehouse that allows them to access department or company employee data, as well as resource information, such as name and location of printers, copy machines, and other environment resources. In the Internet/intranet environment, it will be required to provide user access to such information in a secure manner.

To this end, the Lightweight Directory Access Protocol (LDAP) has emerged as an IETF open standard to provide directory services to applications ranging from e-mail systems to distributed system management tools. LDAP is an evolving protocol that is based on a client-server model in which a client makes a TCP/IP connection to an LDAP server, sends requests, and receives responses. The LDAP information model in particular is based on an "entry," which contains information about some object. Entries are typically organized in a specified tree structure, and each entry is composed of attributes.

LDAP provides a number of known functions including query (search and compare), update, authentication and others. The search and compare operations are used to retrieve information from the database. For the search function, the criteria of the search is specified in a search filter. The search filter typically is a Boolean expression that consists of qualifiers including attribute name, attribute value and Boolean operators like AND, OR and NOT. Users can use the filter to perform complex search operations. One filter syntax is defined in RFC 2254.

LDAP thus provides the capability for directory information to be efficiently queried or updated. It offers a rich set of searching capabilities with which users can put together complex queries to get desired information from a backing store. Increasingly, it has become desirable to use a relational database for storing LDAP directory data. Representative database implementations include DB/2, Oracle, Sybase, Informix and the like. As is well known, Structured Query Language (SQL) is the standard language used to access such databases.

Relational database guidelines (e.g., the First Normal Form) requires that attributes within each tuple are ordered and complete and that searchable domains permit only simple values. Further, simple values cannot be decomposed into multiple values, and they cannot be decomposed into multiple relations. If these guidelines are not followed, the database application becomes quite difficult to manage. Such limitations present difficulties when it is desired to use a relational database as an LDAP backing store. In particular, LDAP allows multi-value attributes. As a result, implementation of the LDAP directory model requires that there is a relation (or table) for each searchable attribute. This "per attribute" table design basically normalizes all the attributes to achieve a manageable implementation. A schema of this type provides a general solution for LDAP applications.

However, for applications which rarely use multi-value attributes, the per attribute table does not perform well for certain functions. In particular, add/updates are very expensive. Thus, for example, for an entry with ten attributes, more than ten tables need to be updated. As another example, logical operations involving multiple attributes require expensive table joins to perform the operation.

It would be highly desirable to provide a database schema to solve the performance problem of per-attribute tables, especially for directory applications that rarely use multi-value attributes. The present invention solves this problem.

BRIEF SUMMARY OF THE INVENTION

It is a primary object of this invention to provide a flexible and efficient database schema for a directory service having a relational database backing store.

It is another primary object of this invention to solve the performance problem of per-attribute tables, especially for directory applications that rarely use multi-value attributes.

It is yet another primary object of the present invention to provide an efficient method of dealing with multi-value attributes in a directory service, e.g., a service conforming to the Lightweight Directory Access Protocol ("LDAP").

A still further object of this invention is to extend the LDAP attribute schema to facilitate handling of multi-value attributes in a relational database backing store.

A more general object of this invention is to provide a reliable and scaleable enterprise directory solution, wherein a preferred implementation is LDAP using a DB/2 backing store.

These and other objects of the invention are achieved by a database schema that includes a so-called "merged" attribute table. The merged attribute table stores normalized attributes to facilitate database searches. Generally, the merged attribute table stores single value attributes, wherein multi-value attributes are stored in the per attribute tables, however, each attribute can exist either in the merged table, an attribute table or both.

In a preferred embodiment, the present invention describes a database schema for storing application data in a backing store of a directory service. Thus, for example, the directory service is LDAP and the backing store is a relational database, such as DB2. The application data has at least some entries with multiple value attributes. According to the invention, the application data is profiled to determine how it may be optimally stored in the backing store. Preferably, single entries having single value attributes are stored in a merged attribute table, while entries having multiple value attributes are stored in per attribute tables. According to the optimization, a majority of the attributes are single valued and are stored in the merged table, and the per attribute tables thus store a relatively smaller number of exceptions. This database schema enhances processing of conventional directory service queries into the backing store.

The foregoing has outlined some of the more pertinent objects and features of the present invention. These objects and features should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 8 is a simplified representation of the merged table structure.

DETAILED DESCRIPTION OF THE PREFERRED EMBODIMENT

Figure 1:
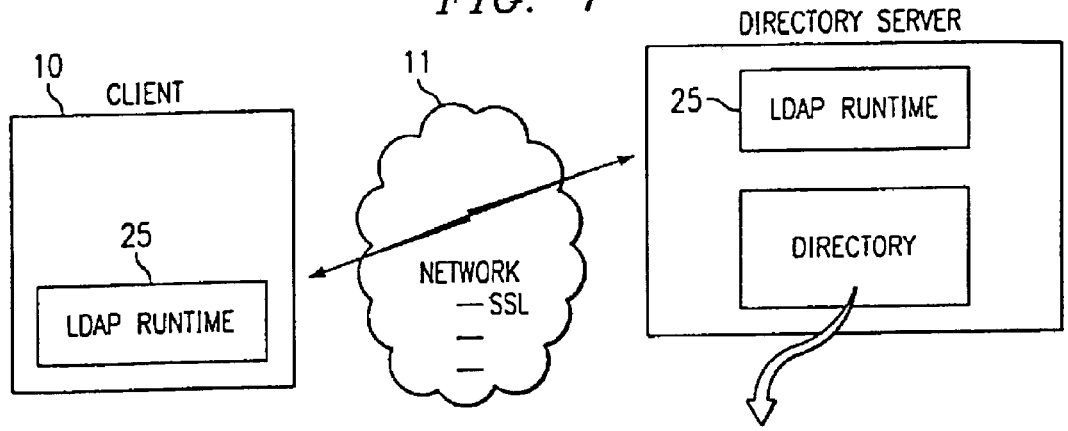
FIG. 1 is a representative LDAP directory service implementation.
Figure 2:
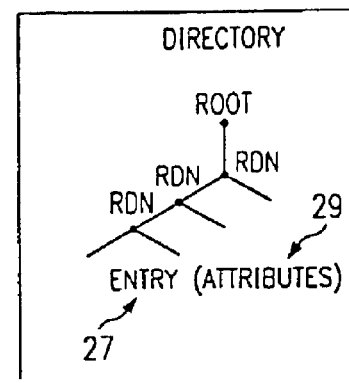
FIG. 2 is a simplified LDAP directory.

A block diagram of a representative LDAP directory service in which the present invention may be implemented is shown in FIG. 1. As is well-known, LDAP is the lightweight directory access protocol, and this protocol has been implemented in the prior art, e.g., as either a front end to the X.500 directory service, or as a standalone directory service. According to the protocol, a client machine 10 makes a TCP/IP connection to an LDAP server 12, sends requests and receives responses. LDAP server 12 supports a directory 21 as illustrated in a simplified form in FIG. 2. Each of the client and server machines further include a directory "runtime" component 25 for implementing the directory service operations as is described below. The directory 21 is based on the concept of an "entry" 27, which contains information about some object (e.g., a person). Entries are composed of attributes 29, which have a type and one or more values. Each attribute 29 has a particular syntax that determines what kinds of values are allowed in the attribute (e.g., ASCII characters, jpeg file, etc.) and how these values are constrained during a particular directory operation.

The directory tree is organized in a predetermined manner, with each entry uniquely named relative to its sibling entries by a "relative distinguished name" (RDN). An RDN comprises at least one distinguished attribute value from the entry and, at most, one value from each attribute is used in the RDN. According to the protocol, a globally unique name for an entry, referred to as a "distinguished name" (DN), comprises a concatenation of the RDN sequence from a given entry to the tree root.

The LDAP search can be applied to a single entry (a base level search), an entry's children (a one level search), or an entire subtree (a subtree search). Thus, the "scope" supported by LDAP search are: base, one level and subtree. LDAP does not support search for arbitrary tree levels and path enumeration.

Figure 3:
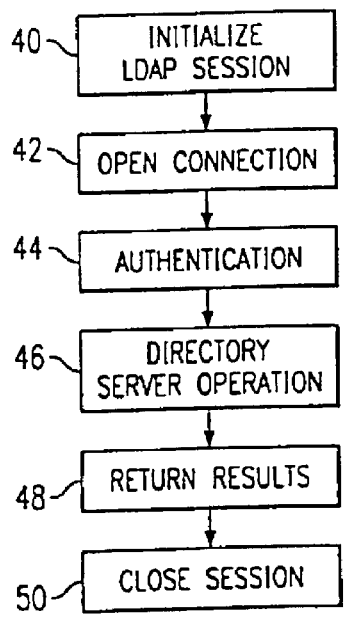
FIG. 3 is a flowchart of an LDAP directory session.

LDAP includes an application programming interface (API), as described in "The C LDAP Application Program Interface", IETF Working Draft, Jul. 29, 1997, which is incorporated herein by reference. An application on a given client machine uses the LDAP API to effect a directory service "session" according to the flowchart of FIG. 3. At step 40, an LDAP session with a default LDAP server is initialized. At step 42, an API function ldap_init( ) returns a handle to the client, and this handle may allow multiple connections to be open at one time. At step 44, the client authenticates to the LDAP server using, for example, an API ldap_bind( ) function. At step 46, one or more LDAP operations are performed. For example, the API function ldap_search( ) may be used to perform a given directory search. At step 48, the LDAP server returns the results of the directory search, e.g., one or more database elements that meet the search criteria. The session is then closed at step 50 with the API ldap_unbind( ) function then being used to close the connection.

Figure 4A:
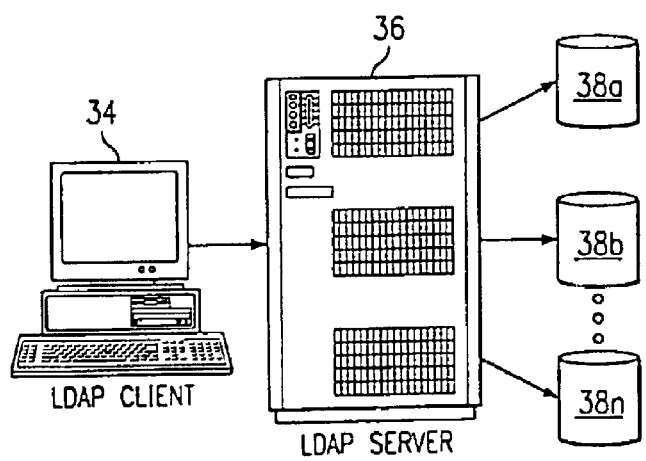
FIGS. 4A–4B show representative LDAP directory service implementations having a relational database backing store.
Figure 4B:
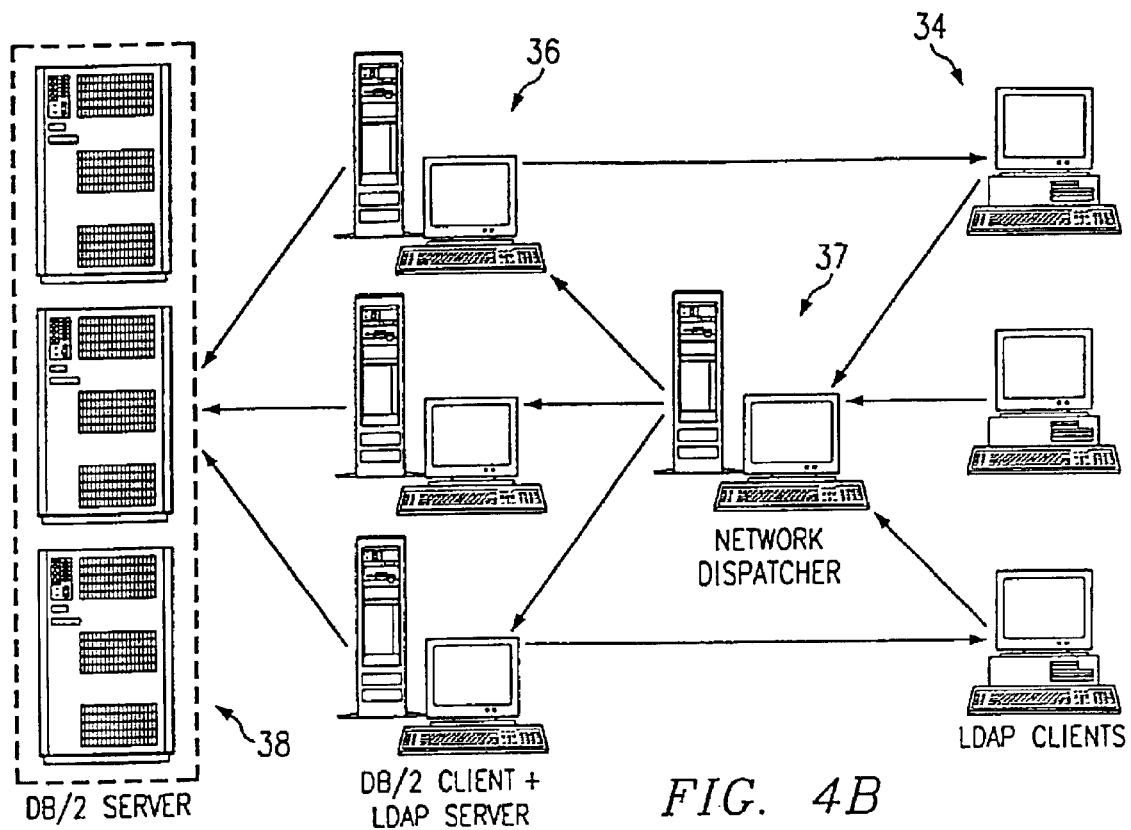

It may be desirable to store LDAP directory data in a backing store. FIGS. 4A–4B illustrate several representative LDAP directory service implementations that use a relational database management system (RDBMS) for this purpose. These systems merely illustrate possible LDAP directory services in which the present invention may be implemented. One of ordinary skill should appreciate, however, that the invention is not limited to an LDAP directory service provided with a DB/2 backing store. The principles of the present invention may be practiced in other types of directory services (e.g., X.500) and using other relational database management systems (e.g., Oracle, Sybase, Informix, and the like) as the backing store.

In FIG. 4A, an LDAP client 34 can connect to a number of networked databases 38a–58n through an LDAP server 36. The databases 38a–38n contain the directory information. However, from the user's perspective, the LDAP server 36 stores all the information without knowing the database 38 in which the data is actually located. With this configuration, the LDAP server 36 is freed from managing the physical data storage and is able to retrieve information from multiple database servers 38 which work together to form a huge data storage.

FIG. 4B illustrates a multiple client/multiple server LDAP/DB2 enterprise solution. In this environment, a DB/2 client preferably runs on each LDAP server 36. Each such DB/2 client can connect to any database server 38 containing directory information. The collection of database servers 38a–38n form a single directory system image, and one or more of the LDAP servers 36 can access such information. Because all the LDAP servers 36 see the same directory image, a network dispatcher 37 may be deployed to route requests among the LDAP servers 36.

One of ordinary skill should appreciate that the system architectures illustrated in FIGS. 4A–4B are not to be taken as limiting the present invention. The inventive technique may be used to search any relational database using hierarchical, filter-based database queries.

Figure 5:
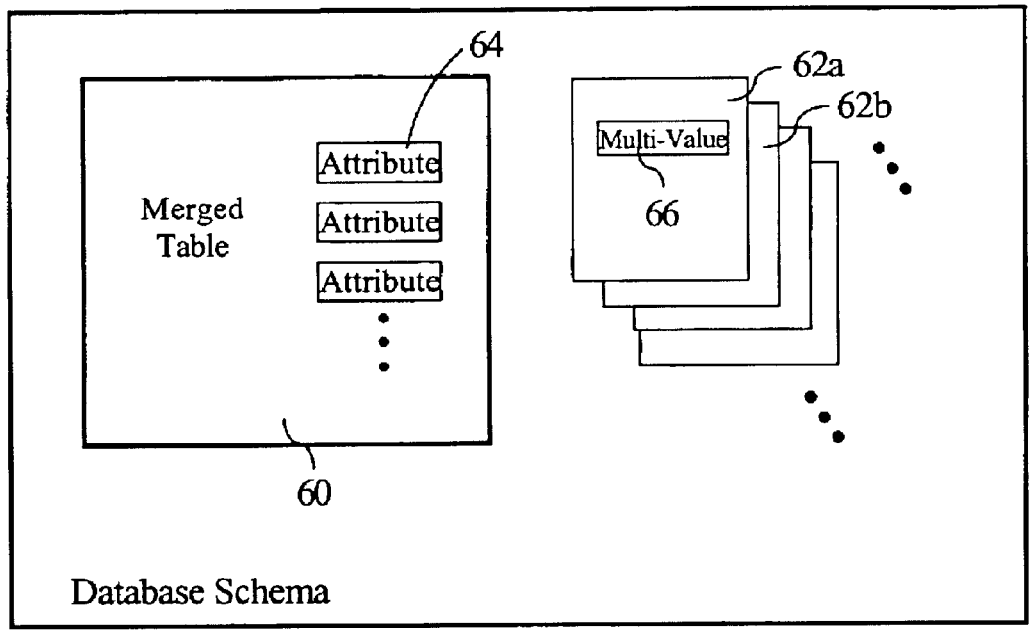
FIG. 5 is a simplified diagram of the inventive database schema.

Implementation of the LDAP directory model requires that there is a relation (or table) for each searchable attribute. This is sometimes referred to as a "per attribute" table database schema. For applications that rarely use multi-value attributes, the per attribute table does not perform well for certain operations. The present invention solves this problem by providing a new database schema wherein a so-called "merged" attribute table is used to store single value attributes. A simplified illustration of the inventive schema is shown in FIG. 5.

As illustrated in this drawing, the novel schema comprises the merged attribute table 60 and the set of per attribute tables 62a–62n. A given set of per attribute tables is sometimes referred to herein as an "overflow" table. According to the present invention, single value attributes 64 are stored into the merged table 60, and multiple value attributes 66 are typically stored in the per attribute tables 62. As will be seen, however, each attribute can exist in the merged table, the per attribute tables, or both.

In the LDAP Version 3.0 schema, attributes having a single value are specified by a SINGLE-VALUE keyword. For example, the attribute "c" contains a two-letter ISO 3166 country code (countryName). The schema definition of "c" is then as follows: (2.5.4.6 NAME 'c' SUP name SINGLE-VALUE). For attributes 66 that are not specified as a single-value attribute in the schema, according to the invention, the default is a multi-value attribute.

Figure 6:
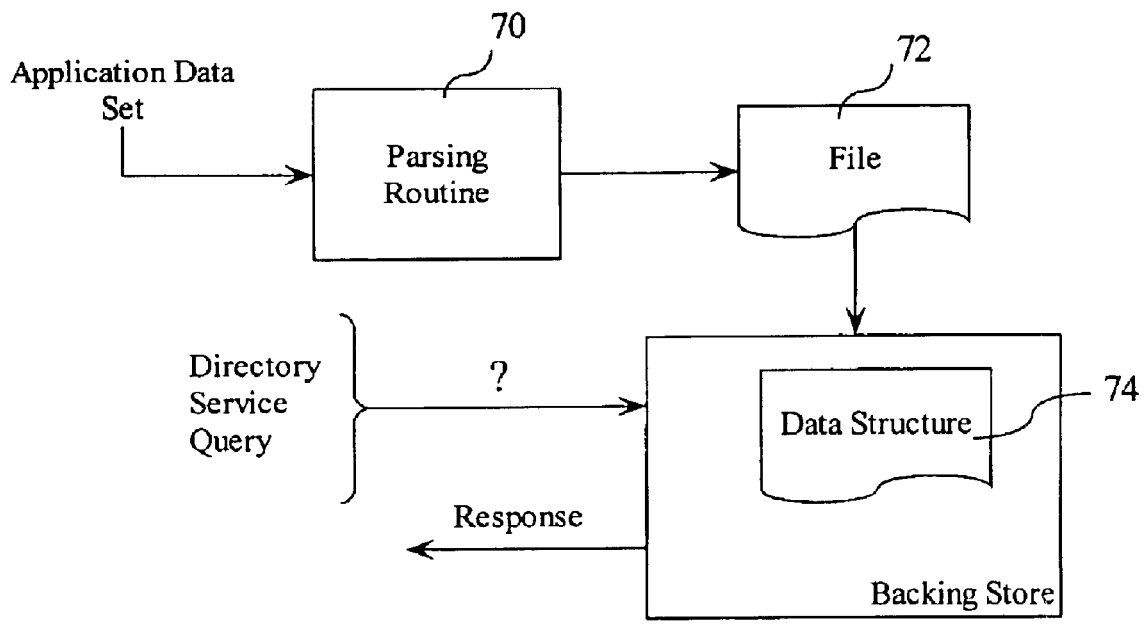
FIG. 6 is a diagram illustrating a process for profiling an application data set to identify appropriate entries for the merged table.

In certain circumstances, it may not be desirable to place all multi-value attributes in the per attribute tables. For example, even though the attribute is specified as a multi-value attribute in the standard schema, the user application may only have a single value in the entry. Another problematic situation arises when the attribute is truly multi-valued, yet a significant number of entries contain more than one value for the attribute. Thus, according to the present invention, it is desirable to parse the application data to be stored in the backing store to determine an optimal configuration for populating the merged attribute table. This process is illustrated in the block diagram of FIG. 6.

As illustrated in this figure, application data to be stored in the backing store is first profiled by a parsing routine 70. The parsing routine may be any given data analysis tool, e.g., an LDIF file, a Lotus Notes NAB or a collection of database records. The output of the parsing routine is a file 72 that preferably comprises the following information for each attribute:

Attribute name

Maximum length of the attribute

Total number of entries that contain this attribute (TOT_E)

Number of entries that contain multiple values of the target attribute (TOT_MULTI)

Percentage entries that contain multiple values of the target attribute (TOT_PERCENT=TOT_MULTI/TOT_E)

The following is an example of the output file 72 generated from the ldif file of representative directory data:
Attribute Name: Name
Max Length: 30
Total number of entries (TOT_E): 10,000
Multi-Value entries (TOT_MULTI): 0
Percentage: 0%
Attribute Name: Office Phone
Max Length: 12
Total umber of entries (TOT_E): 10,000
Multi-Value entries (TOT_MULTI): 100
Percentage: 1%
Attribute Name: Manager
Max Length: 30
Total number of entries (TOT_E): 10,000
Multi-Value entries (TOT_MULTI): 500
Percentage: 2%

In the example above, it can be seen that only a relatively small number of entries have multiple values for the attributes OFFICE PHONE and MANAGER, while the NAME attribute has none (in this example). In other words, all of the people in the representative directory have only one name.

The output of the parsing routine 70 is then used to instruct the directory service as to the optimal way to organize the data stored in the database. In particular, after the data profiling output file 72 is generated, a schema generator 74 uses the profiling output to generate the schema file 75 for the LDAP server. With the example above, the following are representative attribute definitions in the schema file 75:
(2.5.4.4 NAME 'NAME" MERGETBL (merged $ Name)
    INDEX (F))
(2.5.4.10 NAME 'PHONE' MERGETBL (merged $ Phone)
    ATTRTBL (Phone $ Phone)
    INDEX (F))
(2.5.4.4 NAME 'NAME' MERGETBL (merged $ Manager)
    ATTRTBL (Manager $ Manager)
    INDEX (F))

As will be described, the single value attributes (NAME, for example) preferably are stored in the merged table. For those attributes that have a small number of multiple values (OFFICE PHONE and MANAGER, for example), they are stored both in the merged table and the per attribute table. The schema file 75 generated by the schema generator 74 is used by the LDAP server daemon.

Figure 7:
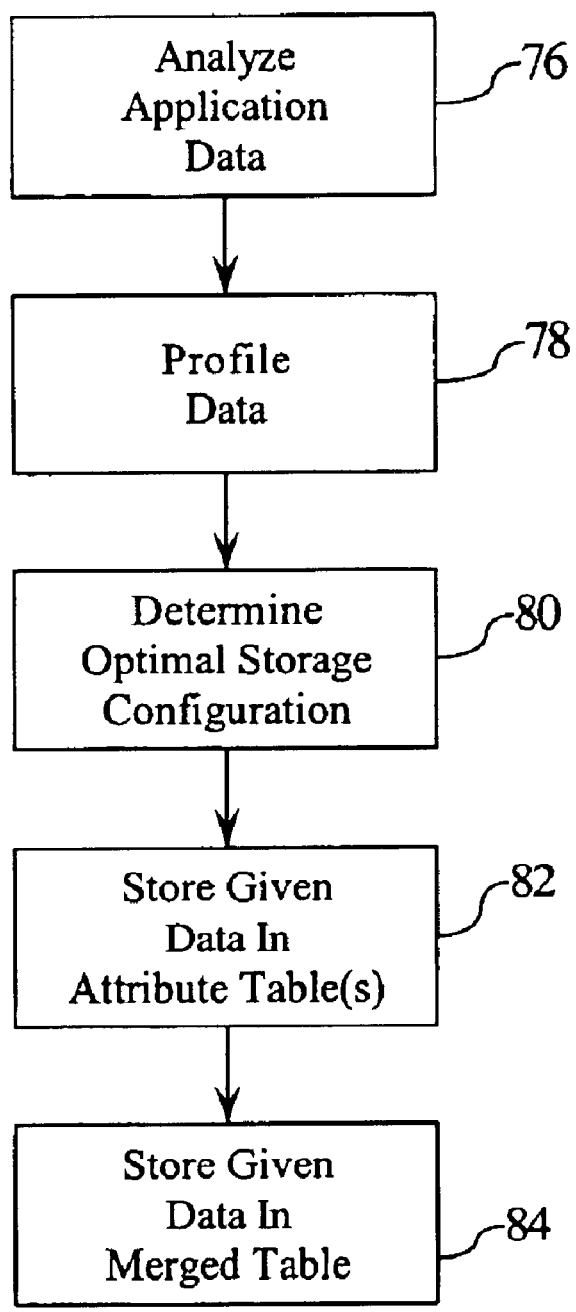
FIG. 7 is a simplified flowchart of the data profiling process.

FIG. 7 is a simplified high level flowchart of the application data parsing routine. The routine begins at step 76 by analyzing the application data. At step 78, the data is profiled to determine whether the data should be in stored in an attribute table or, alternatively, in a merged table and an overflow table comprising a set of attribute tables. The profiling step, for example, parses the data to identify entries with single value attributes. The profiling step may also parse the data to identify given operations that are performed on the data once stored.

At step 80, the routine determine the optimum storage of the data based on the profile. At step 82, given data is stored in an attribute table. At step 84, other given data is stored in a merged table. As noted above, preferably the merged table is used for entries with single value attributes. Preferably, a majority of the data is stored in the merged table and a small set of additional values for the multiple value attributes are stored in the per attribute tables.

The following is a more detailed explanation of the external user schema and internal database schema according to the present invention.

User Schema

The LDAP V3 attribute schema is extended to include the following information for each attribute. For the keyword MERGETBL, the first item on the keyword list is the relational database (e.g., DB2) table name for the merged table, and the second item on the list is the DB2 column name in the merged table. For the keyword ATTRTBL, the first item on the list is the DB2 table name for the per attribute table, and the second item on the list is the DB2 column name in the attribute table. For the keyword INDEX, the character 'F' in the list represent regular indexes, and the character 'R' in the list represents reverse indexes. Of course, the particular characters used are merely exemplary.

Each attribute can exist either in the merged table, the per attribute table, or both, depending on the characteristics of the given application data. The following is an example of the extended attribute schema definition for the X.500 surname attribute, which contains the family name of a person:

(2.5.4.4 NAME 'sn' MERGETBL (merged $ sn)
        ATTRTBL (sn $ sn)
        INDEX (F $ R))

In this example, attribute values "sn" can be found in both the merged table (table name "merged" and column name "sn") and the attribute table (table name "sn" and column name "sn"). Moreover, both regular and reverse indexes are created for the "sn" column in both tables.

This schema information preferably is included in a a distinct configuration file, in this example, a file called slapd.ext.conf. For attributes that do not show up in the extended configuration file, a per attribute table is created as has been previously described. In a representative embodiment, the merged and per attribute tables are stored in the relational database, which may be DB2. In a DB2 embodiment, if the attribute name is less than 15 characters, the DB2 table name and column name preferably are the attribute name. If, however, the attribute name is longer than 15 characters, preferably the attribute name is truncated to 15 characters and a two digit counter value is appended at the end to create a table name. If the table name exists, the counter is incremented and an attempt is then made to create the table. Preferably, the column name is the same as the table name.

DB2 Schema

The following is the schema for the merged attribute table in the preferred embodiment using DB2 as the relational database backing store.

Merged Attribute Table

The purpose of the merged attribute table is to store normalized attributes to assist during the search function. As illustrated in FIG. 8, a column of this table is created when the attribute is a single-value attribute and the attribute syntax is not binary. If the user does not specify whether the attribute is a single or multi-valued attribute, the merged table creates a new column in the merged table if the MERGETBL keyword appears in the slapd.ext.conf file for this attribute. A reverse column is created if the INDEX keyword appears in the slapd.ext.conf file for this attribute and the 'R' option is specified. A DB2 index is created for the reversed data column. A DB2 index is created if the INDEX keyword appears in the slapd.ext.conf file.

Attribute Table

The attribute table is created if the attribute does not appear in the slapd.ext.conf file, or if the attribute appears in the slapd.ext.conf file and ATTRTBL keyword is specified. The attribute table is also created when the attribute value is a truncated value. If the length of the column is longer than 240 bytes, for example, a truncated column is created for indexing. A reverse column is created if the INDEX keyword appears in the slapd.ext.conf file for this attribute and the 'R' option is specified. A DB2 index is created for the reversed data column.

A DB2 index also is created if the INDEX keyword appears in the slapd.ext.conf file. In particular, if the max length of the attribute is longer than 240 bytes, for example, the index is created on the truncated column. If the max length of the attribute is less than 240 bytes, for example, the index is created on the attribute column.

LDAP Filter to SQL Translation

One of the main functions of LDAP/DB2 is to translate the LDAP filter an expression into SQLs. A filter translator (rdbm_xlfilter.c) is used to generate the equivalent SQL expression corresponding to an LDAP filter that can be used in the WHERE clause of an SQL SELECT statement. The following describes the translation that is performed to generate the SQL expressions. The LDAP filter translator also generates the list of SQL tables needed for the FROM clause.

---

Base Level Search:
    SELECT entry.EntryData,
        from ldap_entry as entry
        where entry.EID in (
            select distinct ldap_entry.EID
            from <table list>
            where (ldap_entry.EID=<root dn id> )
                <sql where expressions>)
One Level Search:
    SELECT entry.EntryData,
        from ldap_entry as entry
        where distinct ldap_entry.EID
        from ldap_entry, <table list>
            ldap_entry as pchild, <list of tables>
            where ldap_entry.EID=pchild.EID
            AND pchild.PIED=<root dn id>
                <sql where expressions>)
Subtree Search
    SELECT entry.EntryData,
        from ldap_entry as entry
        where entry.EID in (
            select distinct ldap_entry.EID
            from ldap_entry, ldap_desc, <table list>
            where
            (LDAP_ENTRY.EID=ldap_desc.DEID AND
                ldap_desc.AEID=<root dn id>)
            ldap_entry as pchild. <table list>
            where ldap_entry.EID=ldap_desc.EID
            AND ldap_desc.AEID=%d <where expressions>).

---

In the above representation, <table list> and <where expression> are the two null terminated strings returned by the SQL generator. The <root dn id> is the unique identifier of the root dn. The where clause should only be generated if <where expression> is not the empty string and no errors where detected in the parsing the LDAP filter.

The following is the detailed description of the LDAP filter to SQL translation rules. In the translation rules, the attr_tablename is the attribute table for the specified attribute and attr_columnname is the column name containing the attribute values. The tablename is the name of the merged table. The column name is the column name containing the attribute values. The filter translator invokes an attr_get_info function that returns the rdbm_attr_info data structure, which contains the fully qualified SQL tables name and column name corresponding to the specified attribute name.

EQUALITY (=) translation rule:

If two tables exists in the rdbm_attr_info data structure, the equality type LDAP filter "(attribute=value)" is translated to:

(SELECT EID FROM attr_tablename WHERE attr_columnname='value') UNION
(SELECT EID FROM tablename WHERE columnname='value').
 If only one table exists in the rdbm_attr_info data structure, the equality type LDAP filter "(attribute=value)" is translated to:
(SELECT EID FROM tablename WHERE columnname='value').
GREATER or EQUAL (>=) translation rule:
 If two tables exists in the rdbm_attr_info data structure, the greater or equal type LDAP filter "(attribute>=value)" is translated to
(SELECT EID FROM attr_tablename WHERE attr_columnname>='value') UNION
(SELECT EID FROM tablename WHERE columnname>='value').
 If only one table exists in the rdbm_attr_info data structure, the equality type LDAP filter "(attribute>=value)" is translated to:
(SELECT EID FROM tablename WHERE columnname>='value').
LESS or EQUAL (<=) translation rule:
 If two tables exists in the rdbm_attr_info data structure, the less or equal type LDAP filter "(attribute>=value)" is translated to
(SELECT EID FROM: attr_tablename WHERE attr_columnname<='value') UNION
(SELECT EID FROM: tablename WHERE columnname<='value').
 If only one table exists in the rdbm_attr_info data structure, the equality type LDAP filter "(attribute<=value)" is translated to:
(SELECT EID FROM tablename WHERE columnname<='value').
SUBSTRING (*) translation rule:
 If two tables exists in the rdbm_attr_info data structure, the sub-string type LDAP filter "(attribute=value-with-stars)" is translated to
(SELECT EID FROM attr_tablename WHERE attr_columnname LIKE 'value with percents') UNION
(SELECT EID FROM tablename WHERE columnname LIKE 'value with percents').
 If only one table exists in the rdbm_attr_info data structure, the equality type LDAP filter "(attribute=value-with-stars)" is translated to:
(SELECT EID FROM tablename WHERE columnname LIKE 'value with percents').
PRESENCE translation rule:
 If two tables exists in the rdbm_attr_info data structure, the sub-string type LDAP filter "(attribute=*)" is translated to
(SELECT EID FROM attr_tablename WHERE attr_columnname IS NOT NULL) UNION
(SELECT EID FROM tablename).
 If only one table exists in the rdbm_attr_info data structure, the presence type LDAP filter "(attribute=*)" is translated to:
(SELECT EID FROM tablename).
Approximate Search rule:
 If two tables exists in the rdbm_attr_info data structure, the sub-string type LDAP filter "(attribute~=value)" is translated to
(SELECT EID FROM attr_tablename WHERE SOUNDEX(attr_columnname)=SOUNDEX('value')) UNION
(SELECT EID FROM tablename WHERE SOUNDEX(columnname)=SOUNDEX('value')).
 If only one table exists in the rdbm_attr_info data structure, the equality type LDAP filter "(attribute~=value)" is translated to:
(SELECT EID FROM: tablename WHERE SOUNDEX(columnname)=SOUNDEX('value')).
where SOUNDEX is the soundex library function provided by DB2.
 The above translation rules can be combined into complex LDAP filters using AND, OR, and NOT operators & or | or !. The AND operator & can be used for the Boolean AND of any number of LDAP filters which can be simple or complex. The OR operator | can be used for the Boolean OR of any number of LDAP filters which can be simple or complex. The NOT operator ! can be used for the Boolean NOT of a single LDAP filter that may be simple or complex.
 Basically, LDAP logic operator & is translated into SQL INTERSECT to intersect results from multiple SELECT statements. LDAP operator | is translated into SQL UNION to union results from multiple SELECT statements. The LDAP NOT operator ! is translated into SQL NOT IN to exclude results from a select statement. This process is described in more detail in copending application Ser. No. 09/160,022, assigned to the assignee of this application, the disclosure of which is incorporated herein by reference.
 A few examples (using the Nested Select function) are given below to show the equivalent SQL expressions that are generated for some typical LDAP filters. Because SQL parameter markers are used in the query, the question marks (?) in the query represent the attribute values in the LDAP filter.
Filter String:
---------------
(sn=SMITH)
Scenario 1: if "sn" is a single value attribute:
 slapd config file:
  slapd.at.conf:
   (2.5.4.4 NAME 'sn' SUP name SINGLE-VALUE)
  slapd.ext.conf:
   (2.5.4.4 NAME 'sn' MERGETBL (merge $ sn)
 SQL Statement: SELECT entry.EntryData, CREATOR, MODIFIER, CREATE_TIMESTAMP, MODIFY_TIMESTAMP, entry.EntryBlob, entry.Entrysize FROM LDAP_ENTRY as entry WHERE entry.EID in (SELECT distinct SSHI.LDAP_ENTRY.EID FROM LDAP_ENTRY,ldap_desc WHERE (LDAP_ENTRY.EID=ldap_desc.DEID AND ldap_desc.AEID=?) AND LDAP_ENTRY.EID IN (SELECT EID FROM merge WHERE SN=?)).
Scenario 2: if "sn" is a multiple value attribute and two tables are specified in the configuration file.
 slapd config file:
  slapd.ext.conf:
   (2.5.4.4 NAME 'sn' MERGETBL (merge $ sn)
    ATTRTBL (sn $ sn))
 SQL Statement: SELECT entry.EntryData, CREATOR, MODIFIER, CREATE_TIMESTAMP, MODIFY_TIMESTAMP, entry.EntryBlob, entry.Entrysize FROM LDAP_ENTRY as entry WHERE entry.EID in (SELECT distinct SSHI.LDAP_ENTRY.EID FROM LDAP_ENTRY,ldap_desc WHERE (LDAP_ENTRY.EID=ldap_desc.DEID AND ldap_desc.AEID=?) AND LDAP_ENTRY.EID IN ((SELECT EID FROM merge WHERE SN=?) UNION (SELECT EID FROM SN where SN=?))

Prototype and Performance Results

A prototype has been developed to measure the performance improvements of the inventive database schema. The prototype simulates how the tables are populated in ldap_add with per attribute tables and the merged table.

For Scenario 1 above, when all indexes include 1036 entries and 10 attributes, the merged table includes 715 secs and the attribute table includes 2221 secs. For Scenario 2, in which no indexes except EID on ldap_entry are included and 1036 entries and 10 attributes are included, the merged table includes 587 secs and the attribute table includes 2081 secs.

Experiments were performed with 9000 entries. Based on these experiments, it was found that the time it takes to populate the merged table was about one third of the per attribute table.

As noted above, the invention may be implemented in any hierarchical directory service in which a relational database management system (RDBMS) is used to provide a backing store function. Thus, for example, the principles of the invention may be carried out in an X.500 directory service or hereinafter-developed LDAP implementations. The SQL query generated according to the present invention is used to access the relational database, and results are then returned in response to this query. The invention may also be implemented within a relational database management system being used as an add-on to a directory service. One of ordinary skill will appreciate that the invention can be applied to any relational database management system (RDBMS) and not simply DB/2, the implementation described above. Thus, for example, the relational database may be Oracle, Sybase or any other third party supplied backing store. In addition, the EID sets approach can also be applied to b-tree based LDAP server implementation.

Moreover, although the preferred embodiment has been described in the context of generating a Structured Query Language (SQL) query, the inventive technique should be broadly construed to extend to any relational database query language.

One of the preferred embodiments of the routines of this invention is as a set of instructions (computer program code) in a code module resident in or downloadable to the random access memory of a computer.

Having thus described our invention, what we claim as new and desire to secure by Letters Patent is set forth in the following claims:

What is claimed is:

1. A method for storing data that has at least some entries with multiple value attributes, comprising the steps of:

profiling the data to determine whether the data should be stored in an attribute table or, alternatively, in a merged table and an overflow table; and storing the data optimally based on the profiling step;

wherein a majority of the data is stored in the merged table and a set of additional values for the multiple value attributes are stored in the overflow table.

2. The method as described in claim 1 wherein the entries with single value attributes are stored in the merged table.

3. The method as described in claim 1 wherein the entries with multiple value attributes are stored in the overflow table.

4. The method as described in claim 1 wherein the overflow table is an attribute table.

5. The method as described in claim 1 wherein the profiling step parses the data to identify entries with single value attributes.

6. The method as described in claim 1 wherein the profiling step parses the data to identify given operations that are performed on the data once stored.

7. The method as described in claim 1 wherein the data is stored in a relational database backing store.

* * * * *